United States Patent Office 3,642,638
Patented Feb. 15, 1972

3,642,638
INSULATING IMPREGNATION COMPOSITION OF WAXY AND GREASY ETHYLENE POLYMERS
Motoi Kitano, Settsu-shi, Japan, assignor to Matsushita Electric Industrial Co., Ltd., Kadoma-shi, Osaka, Japan
No Drawing. Filed Nov. 13, 1967, Ser. No. 682,508
Claims priority, application Japan, Dec. 7, 1966, 41/80,700; June 30, 1967, 42/42,716
Int. Cl. H01b 3/30
U.S. Cl. 252—63   3 Claims

ABSTRACT OF THE DISCLOSURE

An insulating impregnation composition for electrical equipment, composed of polymers which are low molecular weight polyethylenes produced along with high molecular weight polyethylenes in the polymerization of ethylene by the high pressure process, medium pressure process or low pressure process, and which have an average molecular weight of 250 to 2000 and which have 0.05 to 3 C=C unsaturated grounds in every molecular chain.

---

The present invention relates to an insulating impregnation composition for electrical equipment and in more detail relates to a waxy or greasy low molecular weight polyethylenes or an insulating impregnation composition containing said polymers.

Insulating impregnation compositions have conventionally been used for the impregnation of dry-type electrical equipments of comparatively small size, such as transformers, condensers, reactors, discharge coils, fluorescent lamp stabilizers and current transformers. These insulating impregnation compositions are provided in the solid state and include various pitches, petroleum waxes and some kinds of thermosetting resins, consisting primarily of hydrocarbons. However, while these solid impregnation compositions have good electrical properties and advantages peculiar thereto, they are not substantially resistive against such adverse effects as brought about by corona or minor discharge occurring in the equipment in which they are used. That is, the impregnation compositions of the hydrocarbon type, when subjected to corona or minor discharge in the equipment, generate gases mainly consisting of hydrogen and, if these gases are not absorbed quickly by the molecules constituting the impregnation composition, voids are formed in said composition which cause continuous corona discharge and thereby inducing further generation of gases. Such undesirable phenomena are repeated in cycle.

Furthermore, since the solid impregnation compositions generally have a large volumetric contraction before and after the impregnation, voids and cracks tend to be formed in the compositions after the impregnation, resulting in the vicious cycle as described above.

With the conventional impregnation compositions, the lives of the equipment are substantially shortened due to the deterioration caused by corona discharge as described above and, in order to deal with such problem, various counter-measures were necessary in the conditions under which said equipment were applied.

An object of the present invention is to provide an impregnation composition which is unsusceptible to the undesirable effect of corona discharge or minor discharge in the equipment in which it is used.

According to the present invention, there is provided an impregnation composition composed of low molecular weight polyethylenes which in terms of state are classified into the range from wax to grease according to the Richards' Classification R. B. Richards, J. Appl. Chem., 1, 370 (1951) and which have an average molecular weight of 250 to 2000 and have 0.05 to 3 C=C bonds in every molecular chain.

The impregnation composition according to the present invention may be impregnated in an equipment by exactly the same method as has been used heretofore, because its melting point is not higher than 110° C. and its viscosity in molten state is no greater than those of the conventional pitches and synthetic resins. As a result of the experiment in which the impregnation composition of this invention was impregnated in such portion of an equipment where discharge occurs, to evaluate the performance thereof, it has been confirmed by infrared absorption spectrum and gas chromatography that the C=C bonds in the polymers, composing the impregnation composition, absorb hydrogen gas, generated under corona or minor discharge, at high efficiency through hydrogenation reaction.

By employing the impregnation composition of this invention, it is possible to avoid the continuous corona discharge caused by the generation of gases as has been encountered with the conventional impregnation compositions, and consequently to retard the deterioration of the associated equipments and thereby to prolong the life of said equipments. The absorptive power of the impregnation composition with respect to hydrogen gas and the rate at which said composition absorbs hydrogen gas, vary depending upon the degree of unsaturation of the molecules constituting said impregnation composition and the average molecular weight of said molecules. For this reason, when the number of C=C bonds per molecular chain of the lower polyethylenes, composing the impregnation composition, is 0.05 or smaller, the absorptive power and the corona discharge retarding effect of said polymers are reduced to a level equal to those of the conventional impregnation compositions, even if the average molecular weight of said polymers is at the lower limit set forth above. Conversely, when the number of C=C bonds exceeds 3, the impregnation composition deteriorates rapidly due to oxidation of the carbon atoms adjacent to the C=C bonds i.e., those in a α-position, and thus is rendered unserviceable for the intended purpose. On the other hand, when the proportion of those polymers increases whose average molecular weight is below the aforesaid lower limit, the weight loss on heating becomes large, making the associated equipment unsuitable for use at high temperatures and also bringing about difficulties in the impregnating operation. Moreover, the break-down voltage becomes extremely low. On the other hand, when the proportion of those polymers, whose average molecular weight is higher than the upper limit set forth above, increases in the impregnation composition, the impregnation composition becomes unsatisfactory in respect of the gas absorptive power as well as the rate of speed of absorption, even if the number of C=C bonds per one molecular chain is 3. The waxy lower polymers and greasy lower polymers are selectively used in accordance with the physical and chemical properties of the desired impregnation composition or the conditions under which the associated equipment is used. These polymers may be used in mixture where a specific hardness, viscosity or microcrystallinity is required.

Some of the polyethylene impregnation compositions according to this invention may be used singly as well as in mixture with other insulating impregnation compositions.

Another object of the present invention, therefore, is to provide an impregnation composition for electric equipment, which consists of a mixture of the greasy lower polyethylenes according to the first invention with microcrystalline wax. The greasy lower polyethylenes used here have an average molecular weight of 400 to 2000 and 0.05 to 3 C=C bonds per molecular chain. The mixing ratio is determined in accordance with the physical and chemical properties of the respective ingredients, and the type and specification of the equipment in which said impregnation composition is used, within the range of 5-95%.

Still another object of the present invention is to provide an impregnation composition for electric equipment, which consists of a mixture of the waxy lower polyethylenes according to the first invention with polybutene oil. The waxy lower polyethylenes used in the mixture have an average molecular weight of 250 to 1500 and a total of 0.05 to 3 C=C bonds per one molecular chain. The polybutenes used have an average molecular weight of 250 to 4000 and a total of 3 to 80 in bromine numbers. The mixing ratio is determined in accordance with the physical and chemical properties of the respective ingredients used as well as the type and specification of the equipment in which said impregnation composition is used, also within the range of 5-95%.

Because of the high crystallinity, microcrystalline wax when used as an impregnation composition for electric equipment, enables excellent initial dielectric characteristics to be obtained but, on the other hand, it tends to have cracks or voids formed therein, particularly when it is used in an electric equipment wherein minor discharge occurs, and thus the life characteristic thereof is deteriorated rapidly. Such drawback of the microcrystalline wax can be alleviated by using the microcrystalline wax in mixture with the greasy ethylenic lower polymers of this invention. The greasy ethylenic lower polymers are somewhat crystalline, so that, when they are added to the microcrystalline wax, the resultant mixture will have substantially the same initial dielectric characteristics with less irregularities, although the crystallinity of the mixture is slightly lower than that of the microcrystalline wax proper. In addition, because of being greasy, the ethylenic lower polymers impart to the impregnation composition thus formed a resistance to crack and void to avoid rapid deterioration of the life characteristic.

Polybutene oil has good gas absorbability when impregnated in an electric equipment but its performance is unsatisfactory at elevated temperatures because of its low melting point. In addition, the polybutene oil deteriorates rapidly by discharge and oxidation, since the length of the branches of the molecular chain and the branching coefficient are large. Therefore, polybutene oil alone is not adapted for use in those equipment which are used at relatively high temperatures and which generate strong corona discharge at high frequency. Such shortcoming of the polybutene oil can be improved when it is used in mixture with the waxy ethylenic lower polymers of this invention, because the mixture has a higher melting point and a higher crystallinity than those of the polybutene oil. In addition, the gas absorptive power will not be attenuated too much by the addition of the waxy ethylenic lower polymers thereto, owing to the fact that both of the polybutene oil and ethylenic lower polymers have C=C bonds therein. The ranges of average molecular weight and the bromine numbers of the polybutene oil specified hereinbefore were determined in consideration of the gas absorptive power, corona discharge retarding effect, weight loss on heating and deterioration on oxidation, as in the case of ethylenic lower polymers.

The ethylenic lower polymers to be used in the impregnation composition according to the present invention can be produced by the high pressure process, medium pressure process or low pressure process, concurrently with polyethylenes of high polymerization degree.

For comparison, the performances of the impregnation composition according to the present invention and the conventional ones are shown in Table 1 below.

TABLE 1

| Composition | No. of bonds C=C | Crystallinity, percent | Average molecular weight |
|---|---|---|---|
| (A)... Waxy ethylenic lower polymers.... | 0.31 | 70 | 640 |
| (B)... { Greasy ethylenic lower polymers (35%). | 0.36 | 14 | 980 |
| Microcrystalline wax (65%)............ | | | 800 |
| (C)... { Waxy ethylenic lower polymers (70%). | 0.30 | 89 | 770 |
| Polybutene oil (30%)................ | 0.93 | | 3,000 |
| (D)... Microcrystalline wax................. | | | 800 |
| (E)... Greasy ethylenic lower polymers.. | 0.34 | 20 | 1,700 |
| (F)... { Greasy ethylenic lower polymers (90%). | 0.38 | 18 | 1,400 |
| Microcrystalline wax (10%)........... | | | 900 |
| (G)... { Waxy ethylenic lower polymers (40%). | 0.29 | 54 | 1,300 |
| Polybutene oil (60%)................ | 0.10 | | 3,400 |
| (H)... Pitch for transformers................ | | | |

The impregnation compositions (A), (B), (C) and (D), shown in Table 1 above, were impregnated in individual metallized papers, produced by directly depositing a metal on a paper by vacuum evaporation, and the electrical characteristics of the condensers were evaluated. The initial electrical characteristics were substantially the same of all metallized papers, except for (D) in which relatively large irregularities were observed. As a result of life test, the impregnation compositions (A), (B) and (C) showed 30% C.R. deterioration, whereas the impregnation composition (D) showed 80% deterioration. The tan δ deteriorations of the impregnation compositions (A), (B) and (C) were slightly smaller than that of (D). Next, the impregnation compositions (E), (F), (D) and (H) were impregnated in individual gas-tube sign transformers. The initial characteristics were the same of all impregnation compositions, but the corona voltages across the coil and the outer casing measured after the life test, were about 5 to 10% lower than the initial voltage in the case of the impregnation compositions (E), (F) and (D), whereas that in the case of (H) was about 25% lower than the initial voltage. The impregnation compositions (E), (F) and (D) were also proved to be slightly superior to (H) in insulation resistance and dielectric strength.

I claim:

1. An insulating impregnation composition for electrical equipment consisting essentially of a mixture of a waxy polymer of ethylene produced by a low pressure polymerization process, said polymer having an average molecular weight of 250 to 1500 and containing 0.05 to 3.0 C=C bonds per molecular chain, and a greasy polymer of ethylene produced by a high pressure process, said polymer having an average molecular weight of 400 to 2000 and containing 0.05 to 3.0 C=C bonds per molecular chain.

2. An insulating impregnation composition for electric equipment consisting essentially of a mixture of a polybutene oil having an average molecular weight of 250 to 4000 and a bromine number of 3 to 80, and a waxy polymer of ethylene produced by a low pressure process, said polymer having an average molecular weight of 250 to 1500 and containing 0.05 to 3.0 C=C bonds per molecular chain.

3. An insulating impregnation composition for electric equipment, consisting essentially of a mixture of a microcrystalline wax and a greasy polymer of ethylene produced by a high pressure process, said polymer having an average molecular weight of 400 to 2000 and containing 0.05 to 3.0 C=C bonds per molecular chain.

References Cited

UNITED STATES PATENTS

| | | | |
|---|---|---|---|
| 2,504,400 | 4/1950 | Erchak, Jr. | 260—94.9 |
| 2,296,854 | 9/1942 | Kemp | 252—63 UX |

FOREIGN PATENTS

| | | | |
|---|---|---|---|
| 35/2,127 | 3/1960 | Japan | 252—63 |

OTHER REFERENCES

Plastics, December 1948, "Low Molec. Wt. Polyethylene Resins, etc.," p. 12.

JOHN T. GOOLKASIAN, Primary Examiner

M. E. McCAMISH, Assistant Examiner

U.S. Cl. X.R.

174—110.44, 127; 260—28, 683.1, 252—63.2